United States Patent [19]

McKeever

[11] 4,019,409
[45] Apr. 26, 1977

[54] STRIPPING AND DEFILLERING METHOD AND APPARATUS

[75] Inventor: Carl William McKeever, Kendallville, Ind.

[73] Assignee: Lyall Electric, Inc., Albion, Ind.

[22] Filed: Aug. 4, 1975

[21] Appl. No.: 601,473

[52] U.S. Cl. .................................................. 81/9.51
[51] Int. Cl.² ......................................... H02G 1/12
[58] Field of Search .............. 81/9.51; 29/421, 426, 29/427; 83/924

[56] References Cited

UNITED STATES PATENTS

| | | | |
|---|---|---|---|
| 1,306,588 | 6/1919 | France | 81/9.51 |
| 3,165,013 | 1/1965 | Oehlerking | 81/9.51 |
| 3,768,143 | 10/1973 | Holmes | 81/9.51 |

Primary Examiner—Al Lawrence Smith
Assistant Examiner—Roscoe V. Parker
Attorney, Agent, or Firm—Gust, Irish, Jeffers & Rickert

[57] ABSTRACT

Method and apparatus for removing filler from a jacketed multiconductor filler cable for termination of the conductors in that cable is disclosed, wherein the outer insulating jacket is removed from a portion of the cable near one end, and an air flow is induced in the vicinity of the jacketless portion to separate the filler from the conductors and thereafter the separated filler is severed from portions of individual conductors near the one end of the cable for termination as desired. The air flow may be provided by a nozzle and die or guide having coaxial apertures therein and relatively movable between a spaced apart position and a position in close proximity for severing the filler material. The jacketless end of the cable is passed through the guide and into the nozzle whereupon the nozzle is moved to the spaced apart position and a flow of air passed through the nozzle and outwardly between the nozzle and die to blow the filler material radially outwardly and thereafter the nozzle is moved toward the die to sever the filler material. Removal of the outer insulating jacket from a portion of the cable may be accomplished by rotating a cutter about the cable which cutter is spring biased away from the cable and provided with weights actuated by rotation to move the cutter toward the cable with a stop preventing the cutter from damaging the conductor insulation within the cable. A variation on the outer cover removing feature allows the contemporaneous stripping of insulation from a stranded single conductor insulated wire and the twisting of those strands to prevent dishevelment of the exposed strands and to expedite further processing of the wire, for example, by eliminating solder dipping of the exposed wire.

10 Claims, 16 Drawing Figures

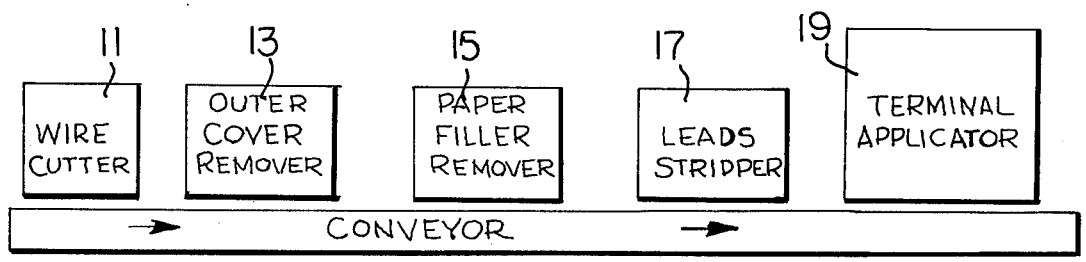
FIG. 1
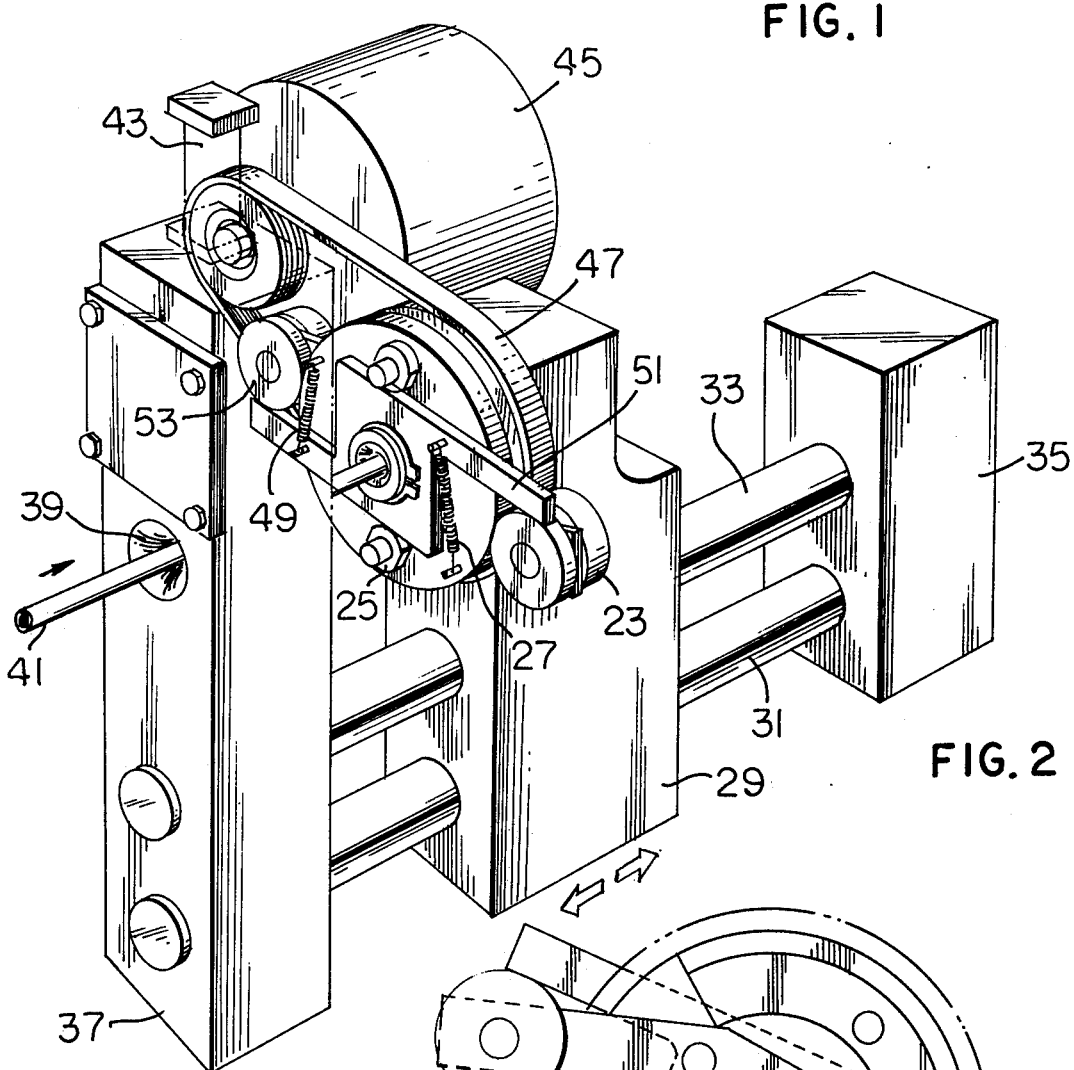
FIG. 2
FIG. 3
FIG. 4

STRIPPING AND DEFILLERING METHOD AND APPARATUS

BACKGROUND OF THE INVENTION

The present invention relates generally to the preparation of electrical conductors for termination and in particular to the preparation of jacketed multiconductor filler cable for termination and is particularly concerned with removal of the cable insulating jacket and separation of the filler from the several internal insulated conductors.

A wide variety of electrical cables are known with many different systems in use for preparing those cables for termination. As one example, rotary insulation strippers for single conductor wire are known where rotating cutters blades are moved radially to the wire by the camming of a frustum itself movable axially to the wire. Many systems have been automated with a corresponding reduction in cost due to the elimination of hand operations. In dealing with filler cable, however, the hand operations have not been heretofore entirely eliminated. Filler cable is still prepared for termination (electrical interconnection) by at least a hand operation of removing the filler material.

Filler cable is typically a jacketed cable having a nonconductive component cabled with insulated conductors to impart roundness, flexibility and/or tensile strength to the cable and this twisted nonconductive component cannot be readily separated from the insulated conductors by other than a hand operation. Extension or appliance cords having a circular cross section such as the typical vacuum cleaner cord have this filler material twisted together with the conductors to impart the roundness to the cord and termination of that cord, for example, on appliance terminals or connectors for plugging the appliance into a home outlet would be more economical if the hand operation of removing the filler material from the ends of the cord or cable could be eliminated.

Conventional wire stripping and outer jacketing equipment fall into one of two categories: those employing blades that rotate around the wire and those that employ opposing blades that close on the wire.

The opposing blade devices generally consist of two identical blades in a spaced apart relationship. The wire end is placed between the blades, the blades are caused to close on the wire and partially cut through the insulation. While the blades are closed, the wire is withdrawn, the insulation is torn through to the conductor and stripped off.

Another type of opposing blade device utilizes a pivot mount for each blade. The operator pushes the wire end against the blades causing them to pivot apart. When the wire is withdrawn, the blades close on the insulation, cut it and strip the severed portion.

The basic disadvantages of these devices are that they do not completely sever the insulation, causing a ragged edge when the stripped portion is removed as well as often stretching the insulation. Further, the straight pull on the wire during removal of the stripped portion causes the wire strands to untwist or straighten. In applications where it is necessary to assure a tight grouping of the stripped conductors, it is often necessary to tin dip the stripped ends of the wire in, for example, molten solder.

Known rotating strippers employ three blades that continuously rotate around the wire. A closing mechanism is controlled by a linkage connected to a foot pedal. The operator inserts the wire and presses the foot pedal. This causes the rotating blades to close on the wire until they contact a preset adjustable stop.

The disadvantages of this type device are that the unit must be running continuously between periods of actually performing the stripping action and further that the direct mechanical linkage required to close the blades is very limiting from an automation viewpoint.

SUMMARY OF THE INVENTION

Among the several objects of the present invention, may be noted the provision of an automatable method of preparing cable for termination; the provision of a unique rotating cutter actuated by centrifugal force; the provision of a rotary insulation stripper having stranded wire twisting capability, the provision of an insulation stripper which minimizes unraveling of conductor strands; the provision of a unique punch and die arrangement which functions to both separate filler from cable conductors and to sever the thus separated filler from the cable; the provision of a unique nozzle and guide arrangement for forced air separation of filler from cable; and the provision of method and apparatus for preparing a jacketed multiconductor filler cable for termination characterized by efficiency in both design and operation.

In general and in one form of the invention, method and apparatus for preparing filler cable for termination accomplishes the steps of removing the outer insulating jacket from a portion of a filler cable near one end thereof, inducing an air flow in the vicinity of that jacketless one end to separate the filler from the conductors and severing the thus separated filler from the cable.

Also in general, a method and apparatus for preparing jacketed cable for termination is provided wherein the rotation of a cutter about the cable near one end thereof is effected with the cutter being urged radially toward the cable and limited in its movement toward the cable to prevent marring individual conductor insulation while substantially severing the outer insulating jacket.

Further in general and in one form of the invention, a generally circular punch and die set which is relatively movable between a spaced apart position and a position in close proximity for severing material about the circle is provided wherein the punch and die each have coaxial cylindrical apertures therein for accepting cable and air may be passed along one of the cylindrical apertures and radially outwardly between the punch and die when in their spaced apart position to force filler radially outwardly away from the cable and across the circumference of the circle for subsequent severing from the cable when the punch and die are moved into close proximity.

In general the invention also provides apparatus and method for operating an electrical cable wherein a head is selectively rotatable about an axis and pivotably supports a plurality of elements at radially disposed locations spaced from the axis with the head further supporting means such as springs for urging the pivotable elements away from the axis. The center of mass of the pivotable elements is disposed relative to the pivot support locations so that rotation of the head about the axis urges a portion of the pivotable elements toward the axis and into working engagement with a cable. The portions of the pivotable elements engaging the cable may be cutters or may be grippers for twisting conductor strands near one end of the cable and both cutters and grippers may be provided.

BRIEF DESCRIPTION OF THE DRAWING

FIG. 1 is a schematic representation of the overall process of the present invention;

FIG. 2 is a perspective view of a rotating cutter arrangement for removing an outer insulating jacket;

FIG. 3 is an end elevation view of the rotating cutter portion of the arrangement of FIG. 2;

FIG. 4 is a perspective view of a multiconductor filler cable with which the present invention has particular utility;

DESCRIPTION OF THE PREFERRED EMBODIMENT

Figure 5:
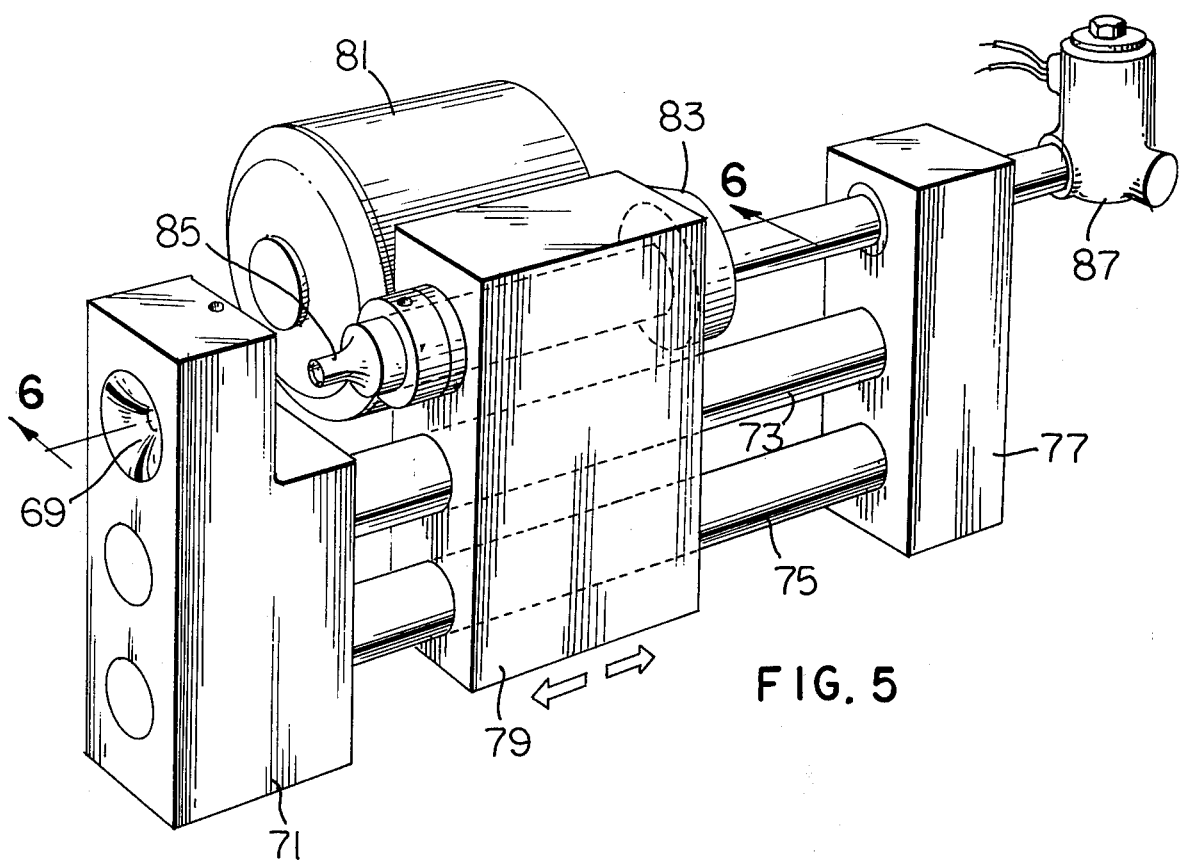
FIG. 5 is a perspective view of an arrangement for separating the filler from the conductors and severing the thus separated filler from the cable.

Considering first the exemplary process depicted in FIG. 1, wire, typically a multiconductor filler cable is supplied from a source such as a spool or drum of wire to a wire cutting station 11, where the wire may be cut to a preferred length for its intended use. One end of that wire or cable is then presented to an outer cover removing station 13 where the outer insulating jacket is removed from a portion of the cable near one end of the cable. At this stage, the cable end would appear as depicted in FIG. 4. The jacketless end of the cable is then presented to a filler removing station 15 where the paper, jute or similar filler is separated from the cable conductors by inducing an air flow in the vicinity of the jacketless end and the separated paper or other filler is severed from the cable. Thereafter, the individual insulated conductors near the one cable end may have their individual insulation stripped off by a somewhat conventional stripper 17 and the cable end terminated for example by applying terminals by crimping or other conventional processes at the power applicator stage 19. As a variation, the process to be discussed in conjunction with FIGS. 11–16 could be used on the individual insulated conductors.

In FIGS. 2 and 3 equipment suitable for performing the outer cover removing step 13 is illustrated. Basically, the structure functions to rotate at least one cutter, such as 21 about the cable with centrifugally actuated weights such as 23, urging the cutter 21 toward the cable and means such as the cam 25 which may be adjusted to a preferred cutting depth limiting the movement of the cutter toward the cable so as to prevent marring individual conductor insulation while substantially severing the outer jacket as the cutter rotates about the cable. The cutter may further be biased away from the cable by a spring such as 27.

In operation, the cutting structure is supported on a movable support block 29 which moves along guide rods 31 and 33 in turn supported at their ends by fixed support structures 35 and 37. The support structure 37 has a conically shaped aperture 39 for the easy insertion of cable 41 into the jacket removing device. That cable is passed through the aperture 39 a preferred distance and then temporarily gripped or held in position by the actuation of an air cylinder 43. Support block 29 is then moved, if not already appropriately located, to a position where the cutter overlies the desired point for jacket removal and the motor 45 energized to drive, by way of belt 47, the rotating cutting structure of FIG. 3.

At rest, the springs 27 and 49 urge the Z-shaped plate 51 to engage weights 23 and 53 holding the sharpened edges 55 and 57 away from the cable. As the cutting structure rotates, weights 23 and 53 are urged outwardly due to the centrifugal force overcoming the biasing effect of springs 27 and 49 and forcing the cutting surfaces 55 and 57 inwardly to engage and sever the cable outer jacket. Radially inward movement of the cutting surfaces 55 and 57 is limited by the Z-shaped member 51 engaging cams such as 25, which are set at a preferred point to insure that the inner conductor insulation of the cable is unharmed. Actual removal of the severed jacket portion may of course be accomplished by moving the support block 29 away from the cable while the cutting surfaces 55 and 57 still engage the jacket or by other means as desired. At the completion of the jacket removing step, the cable end has the appearance illustrated in FIG. 4.

In FIG. 4 the outer jacket 59 has been removed from cable 41 by the circular cut at 61, leaving the inner portions of the cable exposed for some preferred length L depending on the intended manner of termination. In this exposed region, individual insulated conductors such as 63 and 65 are twisted with filler material 67 and so long as the filler and insulated conductors are intertwined as depicted removal of that paper is difficult. To overcome this problem the cable end illustrated in FIG. 4 is passed through another conical guide aperture 69 in a support 71 in the apparatus depicted in FIG. 5.

Somewhat analogous to the earlier discussed structure, a pair of guide rods 73 and 75 extended between the fixed supports 71 and 77 so that a movable support block 79 may be moved back and forth therealong. On the support block 79 is located an electric motor 81, belt coupled to drive the pulley 83, the rotation of which is transmitted to a nozzle or punch 85. The punch 85 has an axially extending air passing aperture therein, coupled to an air source 87 so that air may be passed from the source 87 and out of the aperture in the nozzle 85, when desired.

Figure 6:
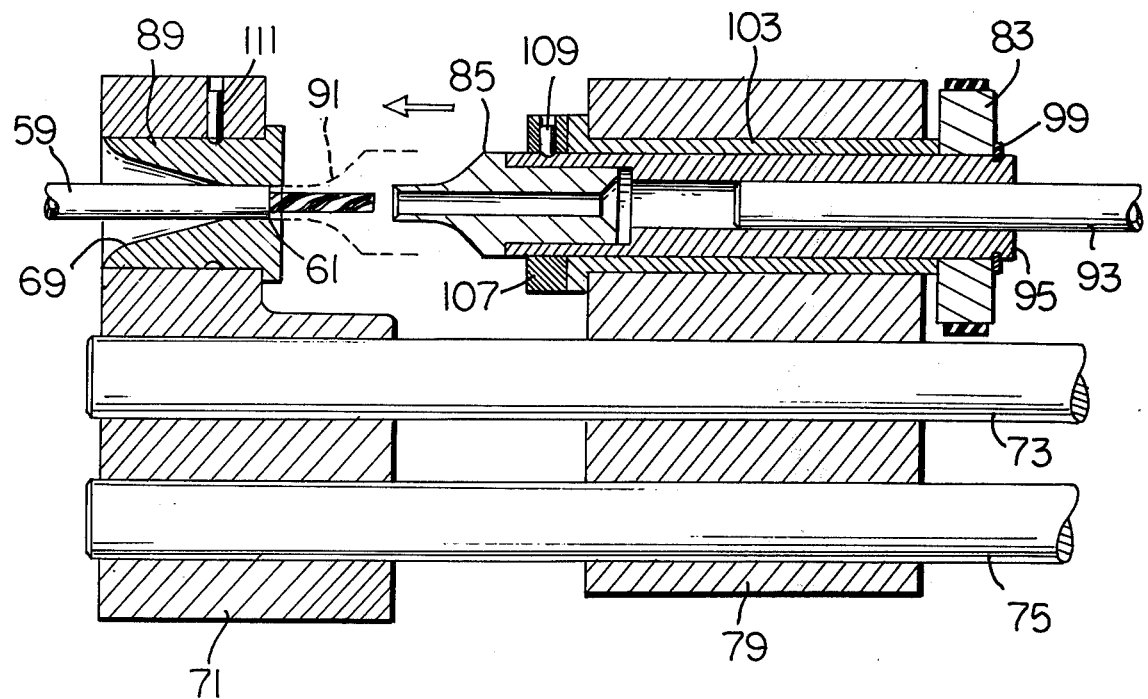
FIG. 6 is a side view in cross section of a portion of the arrangement of FIG. 5 cut along the lines 6—6.
Figure 7:
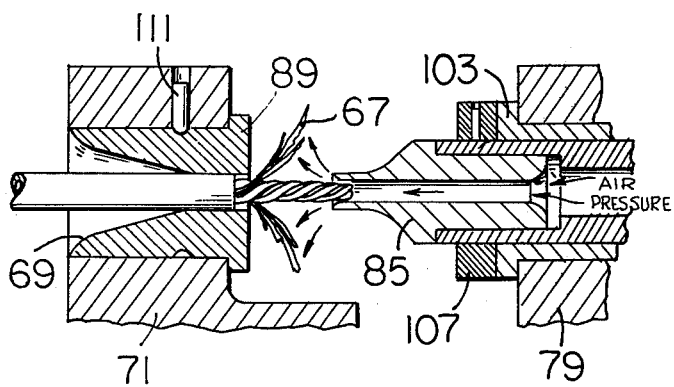
FIG. 7 is a cross sectional view of the punch and die of FIG. 5 in operation.
Figure 8:
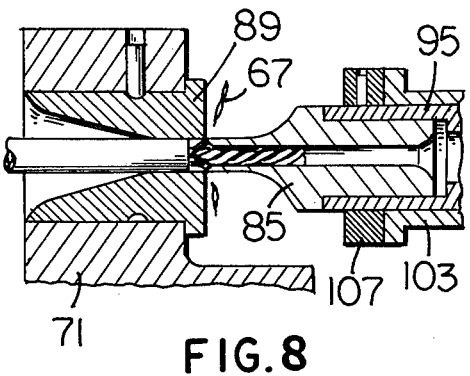
FIG. 8 is a view similar to FIG. 7 illustrating the cutting action of the punch and die.
Figure 9:
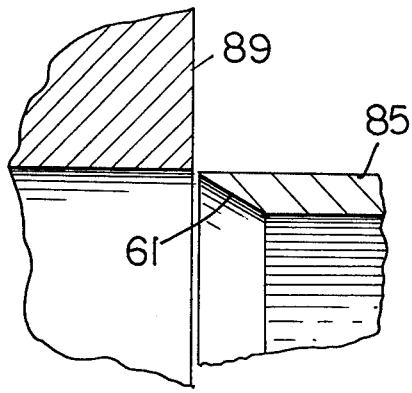
FIG. 9 is an enlarged cross sectional view of the cutting portion of the punch and die of FIGS. 5 through 8.

Considering primarily FIGS. 6, 7 and 8, in FIG. 6 the nozzle 85 is moved into close proximity with a guide means or die 89, as depicted by the dotted line position 91 of the nozzle or punch. At this time the cable 59 is inserted into the conical aperture and stopped by the edge 61 of the cable sheath or jacket abutting the end of the nozzle. The exposed portion of conductors and filler extend into the nozzle in this position. The nozzle is then moved to a filler separating position, as illustrated in FIG. 7, and air passed through the nozzle in the direction opposite that in which the cable was inserted and this air flow acting at the end of the cable tends to flow radially outwardly between the punch and die carrying the filler material with it as illustrated by the arrows in FIG. 7. After the filler material has been forced radially outwardly, the punch and die are relatively moved to the position illustrated in FIG. 8 where they are in close proximity and the cooperating edges of the punch and die function to sever the separated filler material. These cutting edges are shown in greater detail in the cross sectional view of a portion of the punch 85 and die 89 in FIG. 9. In one preferred implementation, the punch entered into the die slightly with between one and two thousandths of an inch clearance between the punch and the die.

Returning briefly to FIG. 4, it will be noted that the fibrous filler material, as well as the several insulated conductors, are twisted and extend in a generally helical pattern within the sheath or outer jacket, and when air is passed through the nozzle the filler unwinds as well as moving radially outwardly from the cable. The action of separating the filler from the cable as depicted in FIG. 7 may be aided by rotating the nozzle 85 relative to the die 89 with the nozzle rotating preferably in the opposite direction as the filler and conductors are twisted. To facilitate moving the nozzle 85 both axially in the direction of its aperture axis and to rotate that nozzle generally about the aperture axis while maintaining an air passageway between the air source 87 and the nozzle 85, the structure illustrated in cross section in FIG. 6 and in an exploded perspective view in FIG. 10 may be employed.

Figure 10:
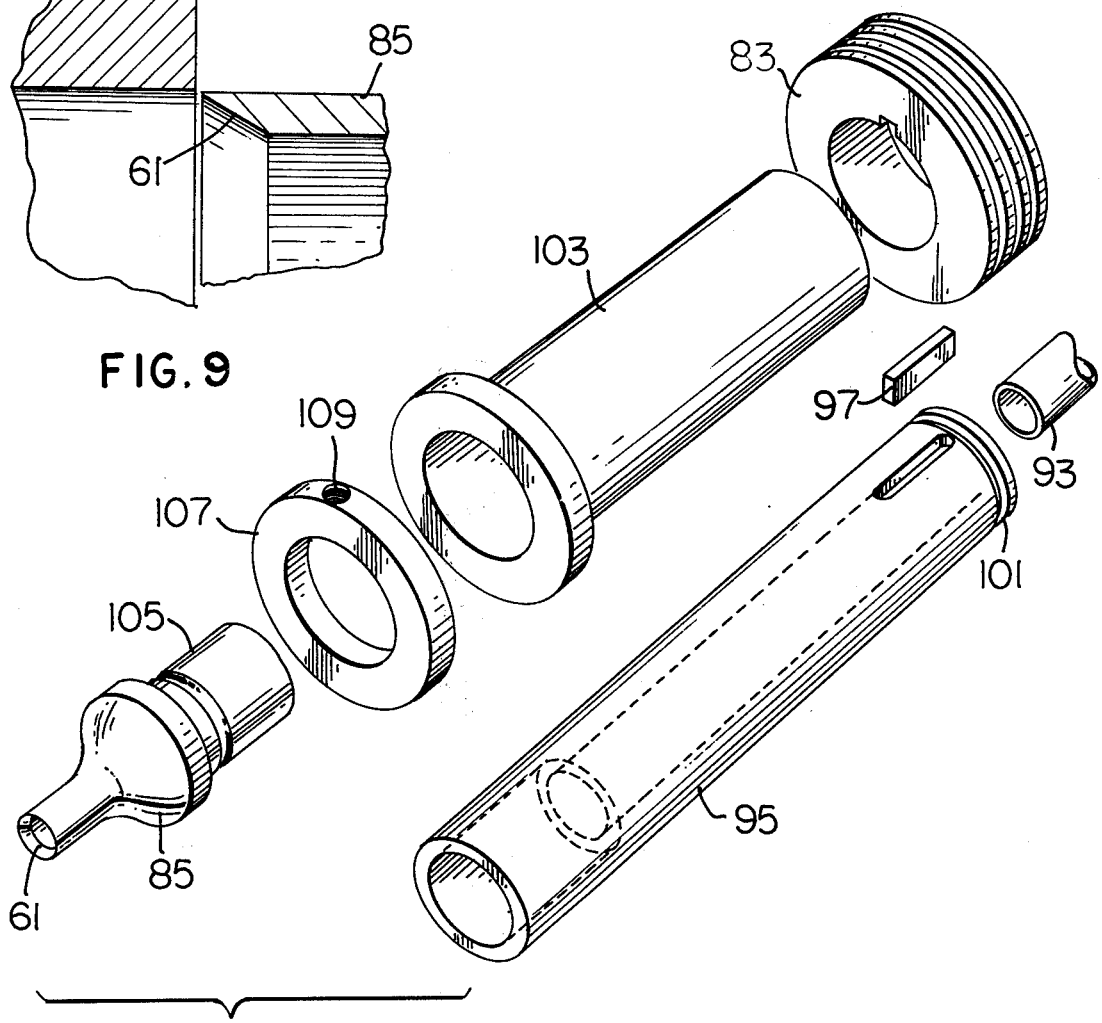
FIG. 10 is an exploded perspective view of the nozzle or punch portion of the arrangement of FIG. 5.
Figure 11:
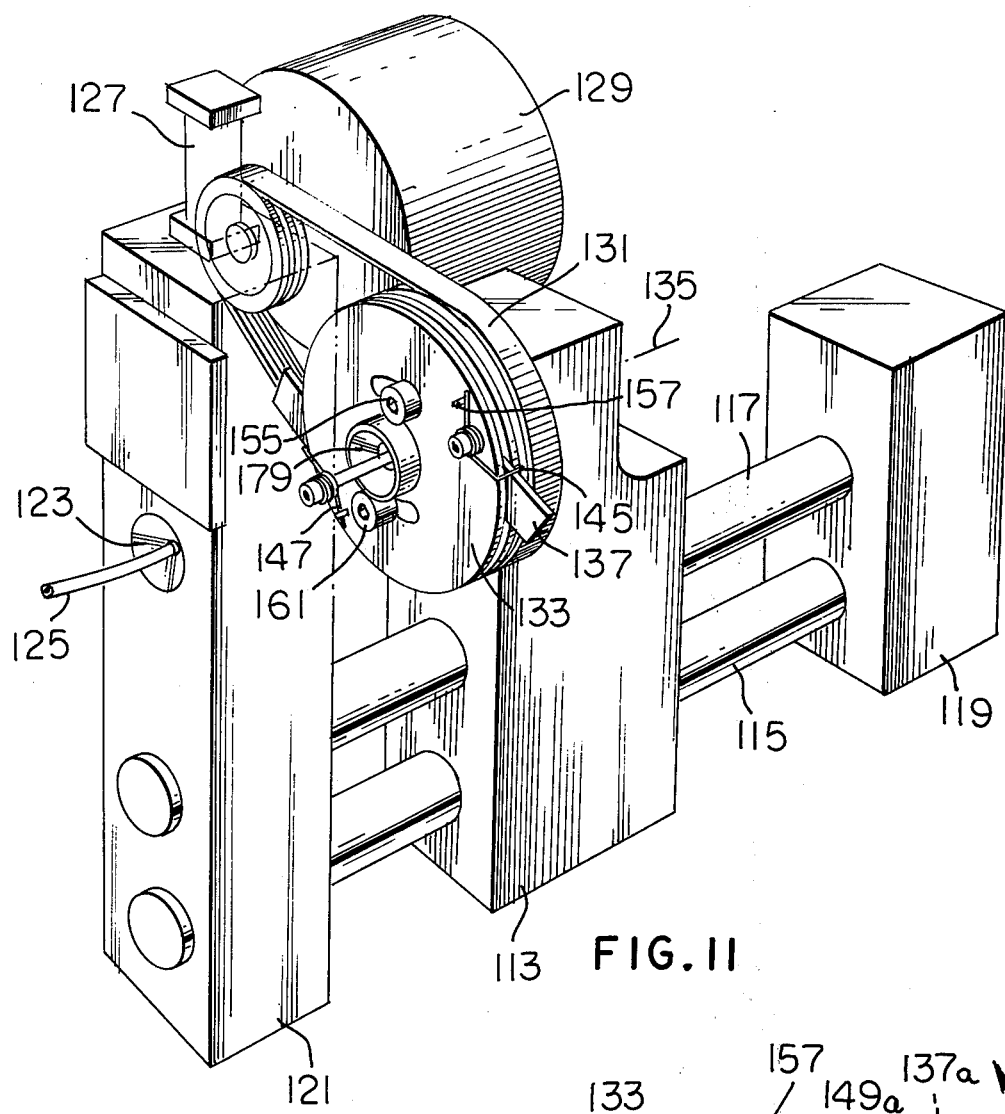
FIG. 11 is a perspective view of a rotating cutter similar to that illustrated in FIG. 2 but embodying the several variations according to the present invention.

In FIG. 10 an air supply pipe 93 slides freely, both axially and rotationally within a sleeve 95, which sleeve may be keyed by key 97 to the pulley 83 and the pulley 83 maintained in one direction on the sleeve 95 by a snap ring 99 engaging the circular slot 101 in sleeve 95. A flanged sleeve 103 lies outwardly of the sleeve 95 and the cylindrical portion 105 of nozzle 85 lies inside the sleeve 95 with a locking ring 107 maintaining the structure together so that the entire nozzle arrangement is movable axially and radially about the air supply pipe 93. The locking ring 107 is held in place by a set screw 109 or other detent structure for ease of removing nozzle 85 to accommodate different size cable. Similarly, the die 89 has an easy removal set screw or other detent device 111 so that these two parts may be changed for different wires.

The invention as illustrated in FIGS. 11–16 operates much as discussed earlier; however, some variations in implementation and application are illustrated. As before the cutting structure is supported on a movable block 113 which moves along guide rods 115 and 117 in turn supported at their ends by fixed support structures 119 and 121. As an alternate preferred in certain automated situations, the movable support block 113 may be supported in a cantilever fashion from a single fixed support structure. The support structure 121 has a conically shaped aperture 123 for the easy insertion of cable 125 into the insulation removing device. The cable 125 is passed through the aperture 123 a preferred distance and then temporarily gripped or held in position by the actuation of an air cylinder 127. Support block 113 is then moved, if not already appropriately located, to a position where the cutter overlies the desired area for insulation removal and the motor 129, which may be electrically energized or air powered, energized to drive by way of a belt 131 the rotating cutting structure or head 133.

Figure 13:
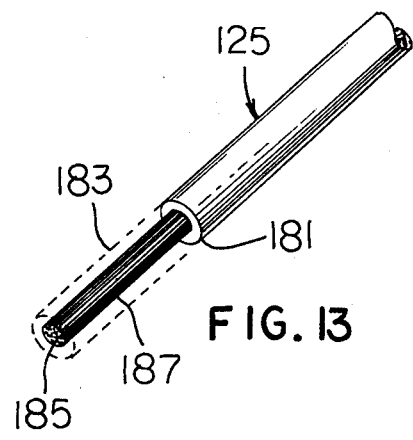
FIG. 13 is a perspective view of an insulated stranded single conductor cable with which the cutter of FIG. 11 has particular utility.
Figure 12:
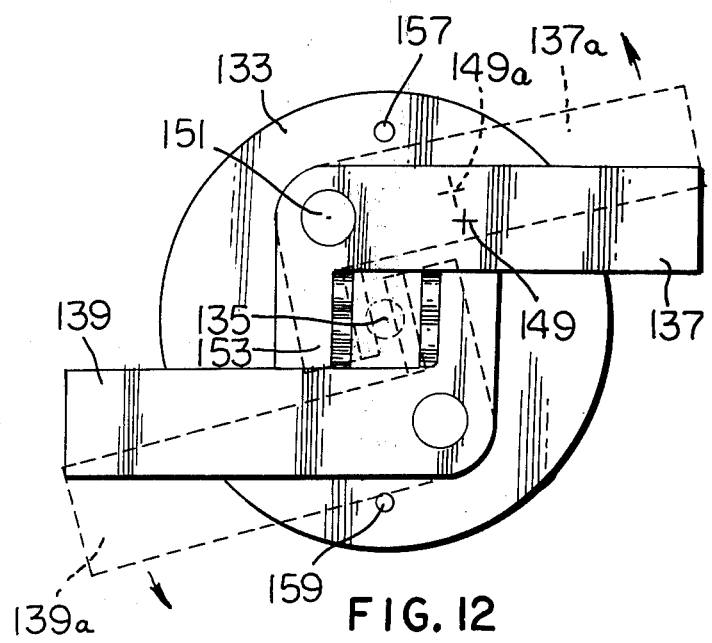
FIG. 12 is an end elevation view of the rotating cutter portion of the arrangement of FIG. 11.
Figure 15:
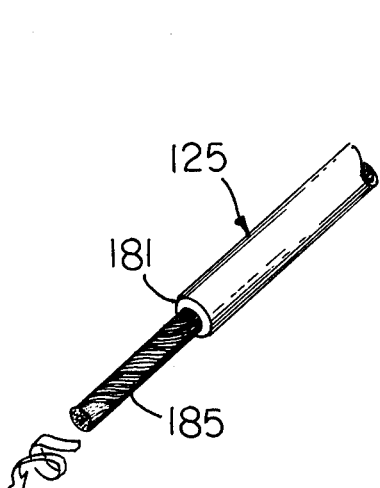
FIG. 15 shows such a cable in perspective with a portion of the cable outer insulating jacket removed and the strands twisted.
Figure 14:
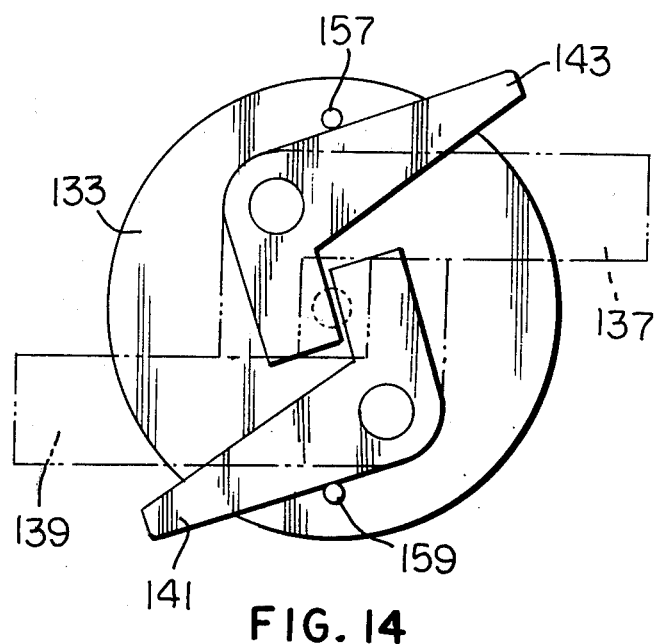
FIG. 14 is a view similar to FIG. 12 illustrating the grippers for twisting conductor strands near one end of a cable.
Figure 16:
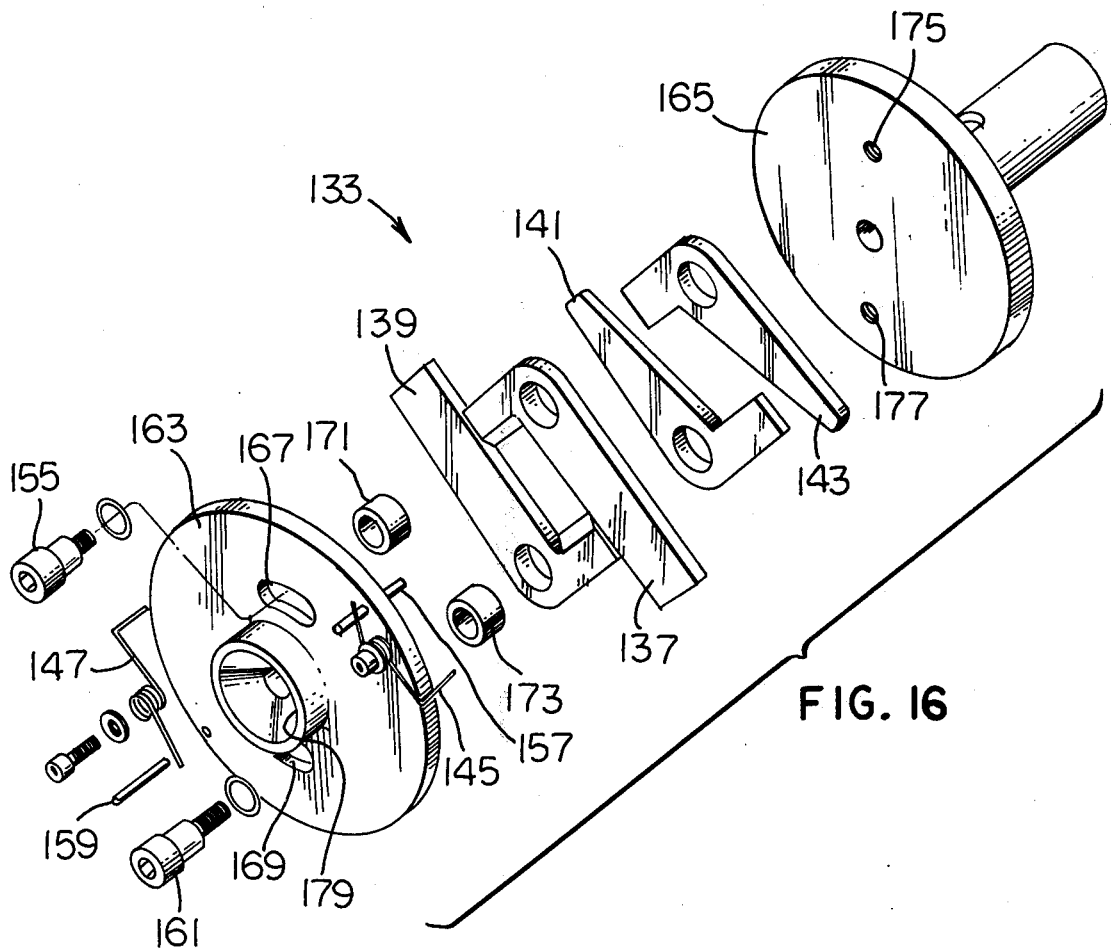
FIG. 16 is an exploded perspective view of the rotating cutter head of the apparatus of FIG. 11.

The structure illustrated in FIGS. 11, 12, 14 and 16 constitutes apparatus for performing a stripping operation on electrical cables for example of the type illustrated in FIGS. 13 and 15. Electrical cables may of course be any assembly of one or more conductors generally within a protective sheath and includes both a stranded or solid single conductor cable as well as cable having a multiplicity of conductors insulated from one another. In either case, the cable contents are those insulative or conductive elements within the cable outer sheath.

Head 133 is suitably journalled in support block 113 for selective rotation about an axis 135 which axis coincides generally with that of the cable positioned for stripping. A plurality of pivotable elements 137, 139, 141 and 143 are pivotably supported on the head at locations spaced from the axis 135 with each of the pivotable elements being urged away from the axis by the springs 145 and 147. The center of mass 149 of exemplary pivotable element 137 is disposed relative to the pivot support location 151 so that rotation of the head about the axis 135 urges a portion 153 of the pivotable element 137 toward the axis 135 and into working engagement with the cable 125. The portion of the pivotable element which engages the cable may comprise cutters such as those associated with pivotable elements 137 and 139 for substantially severing the cable outer insulation or, as in the case of pivotable elements 141 and 143, may function to twist conductor strands near one end of the cable. In the illustrated preferred embodiment of course both insulation severing and strand twisting occurs with the cutters 137 and 139 being axially separated from the gripping or twisting elements 141 and 143.

To limit the movement of the cutters 137 and 139 toward the axis 135 to prevent scoring or damage to the cable content while substantially severing the cable outer insulating jacket, a pair of stop pins 157 and 159 are provided to limit the radially outward movement of the cutter mass centers. To accommodate differing size cables the relative location of the cutters 137 and 139 and the stop pins 157 and 159 may be adjusted by loosening the cap screws 155 and 161, revolving the plate 163 relative to the plate 165, and retightening cap screws 155 and 161. Radially extending elongated slots 167 and 169 in plate 163 allow for this adjustment while those same cap screws 155 and 161 may, by employing the bushings 171 and 173, function to pivotably support the several pivotable elements.

In operation cable 125 is inserted into the head 133 to lie generally along the axis 135 either by hand or automatically and the head 133 may be provided with a conical centering entranceway 179 if desired. At this time springs 145 and 147 are maintaining the several L-shaped plates or pivotable elements in a position away from the axis 135. When the motor 129 is energized centrifugal force urges the center of mass of each of the L-shaped plates outwardly bringing their respective work engaging portions closer to the axis 135. Specifically rotation of the head 133 in either direction will urge the cutting edges of the cutters 137 and 139, which are diametrically opposed, toward the cable to sever the outer insulating jacket for example at 181 in FIGS. 13 and 15. At the same time the diametrically opposed portions of the pivotable elements 141 and 143 engage the outer insulation in an area 183 axially displaced from the cut 181. These grippers 141 and 143 twist, by way of the short segment 187 of insulation to be removed, the strands 185 together as illustrated in FIG. 15.

When slight variations the stripper, as thus far discussed in conjunction with FIGS. 11-16, may be operated in a fully automatic mode in a system such as depicted in FIG. 1. The cutting head assembly 133 may be driven by an air motor 129 and both be mounted on a movable base 113 which is mechanically movable in the direction of axis 135 by a small air cylinder to impart a forward or backward reciprocating motion of the base 113. Cable segments may be held and moved laterally to the axis 135 by a conveyor system and when a cable segment reaches an appropriate point aligned with axis 135 a switch or indicator causes the air cylinder to move the base 113 toward the wire encompassing the wire or cable within the head 133. When the base 113 reaches its forward limit another switch or indicator energizes the motor 129. The cutter head 133 rotates and centrifugal force closes the blades on the cable thereby severing the outer insulating jacket. The air cylinder then is actuated to retract the cutting head assembly away from the cable pulling the severed insulation with it and completing the twisting operation. As the base 113 retracts, the motor 129 is deenergized and the head 133 may engage a friction brake to stop rotation thereby allowing the cutting and twisting members to retract away from the axis 135. The wire is then moved out of the stripping area and another wire or cable moved into position. The stripper of FIGS. 11, 12, 14 and 16 may, of course, be employed for stripping only or for twisting only and its principles are fully interchangeable with those of the outer cover remover of FIGS. 2 and 3.

Thus while a novel method and apparatus for stripping and for removing filler from cable has been disclosed, numerous modifications will readily suggest themselves to those of ordinary skill in the art and accordingly the scope of the present invention is to be measured only by that of the appended claims.

What is claimed is:

1. Apparatus for performing an operation on electrical cable comprising:
   a head selectively rotatable about an axis;
   at least one pivotable element pivotably supported on the head at a first location spaced from the axis;
   at least another pivotable element pivotably supported on the head at a second location spaced from the axis and spaced axially from the first location;
   means for urging each pivotable element away from the axis; and
   the center of mass of each pivotable element disposed relative to the respective pivot support location so that rotation of the head about the axis urges a portion of each pivotable element toward the axis and into working engagement with a cable, the portion of the one pivotable element for engaging the cable comprising a cutter for substantially severing cable insulation and the portion of the another pivotable element for engaging the cable comprising means for twisting the conductor strands near one end of the cable.

2. The apparatus of claim 1 wherein a plurality of radially disposed pivotable elements are provided for severing cable insulation and a plurality of radially disposed pivotable elements are provided for twisting the conductor strands.

3. The apparatus of claim 1 further comprising means for limiting the movement of the cutter toward the axis to prevent damage to the cable contents while substantially severing the cable outer insulating jacket.

4. The apparatus of claim 3 wherein the means for limiting may be adjusted to accommodate differing size cables.

5. Apparatus for preparing a jacketed multi-conductor filler cable for termination comprising:
   a cutter;
   means for rotating the cutter about the cable near one end thereof
   means for urging the cutter toward the cable;
   means for limiting the movement of the cutter toward the cable to prevent marring the individual conductor insulation while substantially severing the outer insulating jacket; and
   means operable after the removal of the outer insulating jacket to separate and sever filler material from the cable including a nozzle having an axially air passing aperture therein, means for guiding the cable axially into the nozzle aperture, means for moving the nozzle axially relative to the guiding means between a first cable accepting position, a second filler separating position, and a third filler severing position.

6. The apparatus of claim 5 further comprising a spring biasing the cutter away from the cable, the means for urging comprising centrifugally actuated means coupled to the cutter and responsive to rotation about the cable to overcome the spring bias and move the cutter toward the cable.

7. Apparatus for preparing a multiconductor filler cable for terminating comprising a generally circular punch and die set relatively movable between a spaced apart filler separating position and a position in close proximity for accepting cable and for severing material about the circle, the punch and die each having coaxial cylindrical apertures therein for accepting cable and including means for passing air along one of the cylindrical apertures and radially outwardly between the punch and die when in their spaced apart position to force filler radially outwardly away from the cable and across the circumference of the circle for subsequent severing from the cable when the punch and die are moved relatively axially into close proximity.

8. The apparatus of claim 7 further comprising means for relatively rotating the punch and die about the axis of the apertures.

9. Apparatus for preparing a jacketed multiconductor filler cable for termination comprising:
   means for removing the outer insulating jacket from a portion of the cable near one end thereof;
   means for providing an air flow in the vicinity of the jacketless portion to separate the filler from the conductors; and
   means for severing the separated filler from the cable, the apparatus including a nozzle having an axially air passing aperture therein, means for guiding the cable axially into the nozzle aperture, means for moving the nozzle axially relative to the guiding means between a first cable accepting position, a second filler separating position, and a third filler severing position, the means for providing including the nozzle and the means for severing including the nozzle and the guide means.

10. The apparatus of claim 9 further comprising means for rotating the nozzle about the air passing aperture axis.

* * * * *